(12) United States Patent
Hackl et al.

(10) Patent No.: US 10,479,324 B2
(45) Date of Patent: Nov. 19, 2019

(54) WINDSCREEN WIPER DEVICE

(71) Applicant: Robert Bosch GmbH, Stuttgart (DE)

(72) Inventors: Viktor Hackl, Sopron (HU); Peter Deak, Budapest (HU); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/036,272

(22) PCT Filed: Oct. 30, 2014

(86) PCT No.: PCT/EP2014/073273
§ 371 (c)(1),
(2) Date: May 12, 2016

(87) PCT Pub. No.: WO2015/071104
PCT Pub. Date: May 21, 2015

(65) Prior Publication Data
US 2016/0297403 A1    Oct. 13, 2016

(30) Foreign Application Priority Data

Nov. 12, 2013 (DE) .................. 10 2013 222 993

(51) Int. Cl.
*B60S 1/34* (2006.01)
*B60S 1/38* (2006.01)
(Continued)

(52) U.S. Cl.
CPC .......... *B60S 1/3436* (2013.01); *B60S 1/3459* (2013.01); *B60S 1/3801* (2013.01); *B60S 1/3425* (2013.01);
(Continued)

(58) Field of Classification Search
CPC .... B60S 1/3436; B60S 1/3459; B60S 1/3801; B60S 1/38; B60S 1/3425; B60S 1/3443;
(Continued)

(56) References Cited

U.S. PATENT DOCUMENTS 2,964,775 A   12/1960 Krohm
3,419,299 A   12/1968 Oishei
(Continued)

FOREIGN PATENT DOCUMENTS

CA    2895008 A1 *  6/2013  ............ B60S 1/3427
CN    102068360 A     5/2011
(Continued)

OTHER PUBLICATIONS

International Search Report for Application No. PCT/EP2014/073273 dated Jan. 27, 2015 (English Translation, 3 pages).
(Continued)

*Primary Examiner* — Monica S Carter
*Assistant Examiner* — Katina N. Henson
(74) *Attorney, Agent, or Firm* — Michael Best & Friedrich LLP

(57) ABSTRACT

The present invention relates to a windscreen wiper device (100) for a vehicle, with a fastening element (52), in particular to a motor vehicle. The windscreen wiper device (100) comprises a mounting element (40) which is designed to be mounted on the fastening element (52), and a wiper blade (2) with an elongate upper part (10) and an elongate lower part (12), which are configured to be at least partially bendable. Furthermore, a plurality of connecting elements (18) for connecting the upper part (10) and the lower part (12) are provided, wherein the connecting elements (18) are spaced apart from one another along a longitudinal extent (8) of the wiper blade (2). The connecting elements (18) are designed in order to permit a movement of the upper part (Continued)

(10) and of the lower part (12) relative to each other with a movement component along a longitudinal extent (8) of the wiper blade (2). Furthermore, the wiper blade (2) comprises a wiper-blade-side fastening part (20). The wiper-blade-side fastening part (20) is configured in such a manner that, by means of a rotation of the wiper-blade-side fastening part (20) relative to the mounting element (40), an engagement can be formed in order to connect the wiper-blade-side fastening part (20) to the mounting element (40).

22 Claims, 4 Drawing Sheets

(51) Int. Cl.
*B60S 1/40* (2006.01)
*F16B 7/00* (2006.01)
*F16B 7/20* (2006.01)

(52) U.S. Cl.
CPC ............ *B60S 1/3427* (2013.01); *B60S 1/3443* (2013.01); *B60S 1/38* (2013.01); *B60S 1/40* (2013.01); *B60S 2001/3812* (2013.01); *F16B 7/00* (2013.01); *F16B 7/20* (2013.01); *Y10T 403/10* (2015.01); *Y10T 403/18* (2015.01); *Y10T 403/7005* (2015.01)

(58) Field of Classification Search
CPC .. B60S 1/342; B60S 1/345; F16B 7/00; F16B 7/20; Y10T 403/43; Y10T 403/46; Y10T 403/10; Y10T 403/18; Y10T 403/7005; Y10T 464/40; Y10T 408/907; Y10T 408/95; Y10T 409/30952
USPC .......... 15/250.16, 250.34, 250.351, 250.352; 296/78.1; 403/93, 94, 246; 464/181, 464/104, 105
See application file for complete search history.

(56) References Cited

U.S. PATENT DOCUMENTS

| | | | |
|---|---|---|---|
| 4,439,886 A * | 4/1984 | Yagasaki | B60S 1/08 15/250.16 |
| 6,833,682 B2 * | 12/2004 | Buchanan, Jr. | B60S 1/32 15/250.001 |
| 6,863,465 B2 | 3/2005 | Brancheriau | |
| 8,181,306 B2 * | 5/2012 | Merkel | B60S 1/345 15/250.202 |
| 2006/0218740 A1 | 10/2006 | Coughlin | |
| 2011/0110716 A1 | 5/2011 | Slater et al. | |
| 2016/0159322 A1 | 6/2016 | Weiler et al. | |

FOREIGN PATENT DOCUMENTS

| | | |
|---|---|---|
| CN | 102791407 A | 11/2012 |
| CN | 102865278 A | 1/2013 |
| CN | 202768576 U | 3/2013 |
| DE | 19731683 A1 | 1/1999 |
| DE | 19754449 A1 | 5/1999 |
| DE | 10007808 A1 | 9/2001 |
| DE | 102013214064 A1 | 5/2014 |
| EP | 0625452 A1 | 11/1994 |
| FR | 2103349 A5 | 4/1972 |
| FR | 2899857 | 10/2007 |
| FR | 3010366 A1 | 3/2015 |
| GB | 712452 | 7/1954 |
| JP | 63129658 | 8/1988 |
| JP | S63129658 U | 8/1988 |
| JP | 0542020 | 6/1993 |
| JP | H0542020 U | 6/1993 |
| JP | 2002098114 A | 4/2002 |
| JP | 2010048367 | 3/2010 |
| WO | 2015071104 A1 | 5/2015 |

OTHER PUBLICATIONS

International Search Report for Application No. PCT/EP2015/065790 dated Oct. 14, 2015 (English Translation, 2 pages).

* cited by examiner

WINDSCREEN WIPER DEVICE

BRIEF DESCRIPTION OF THE DRAWINGS

The invention relates to a windshield wiper device for a vehicle, in particular a motor vehicle.

Windshield wiper devices typically have a wiper arm or wiper lever, wherein a wiper blade is moved on the windshield of a motor vehicle. Here, the wiper blade is moved between a first reversal point and a second reversal point. For this purpose, the wiper arm is connected by way of a drive shaft to a wiper motor. In particular on windshields with intense changes in curvature, the wiper blade easily loses contact with the windshield. This can give rise, in particular in the case of intensely curved windshields, to non-wiped wiping areas, and/or to smearing.

Figure 1:
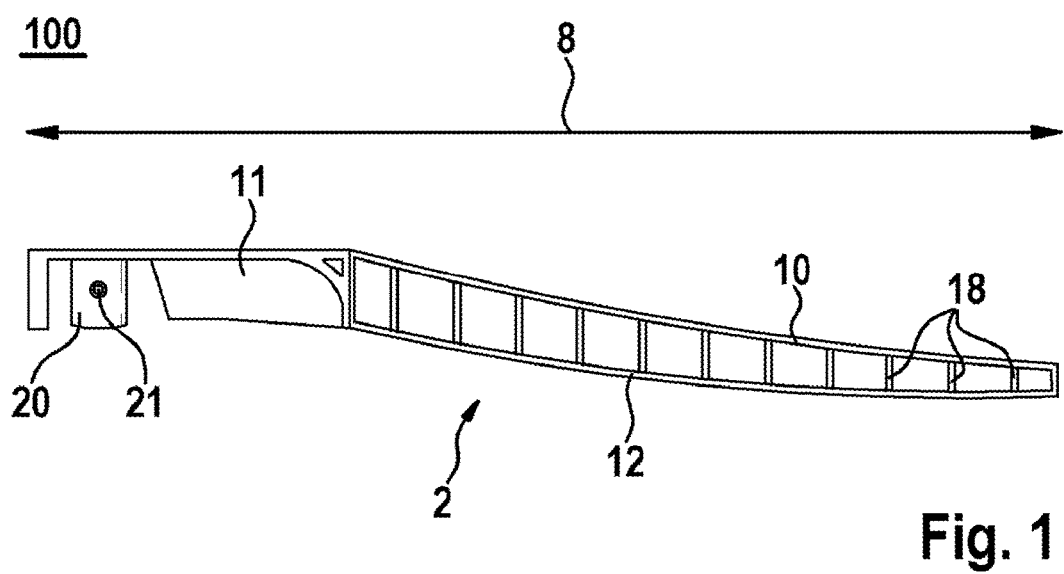

Since a wiping process must be optimized with regard to a multiplicity of parameters, such as for example an amount of rain falling on the windshield, a possible snow load on the windshield, the speed of the vehicle and associated wind pressure on the wiper arm, smearing cannot be reliably prevented simply by adapting the pressure of the wiper arm on the windshield. It is therefore a requirement to further improve windshield wiper devices.

For the improvement, there is a multiplicity of boundary conditions that must additionally be taken into consideration. Said boundary conditions include the outlay for production or the production costs, the material costs, but also the characteristics of the windshield wiper device, in particular the function under a variety of conditions, and the durability under a multiplicity of conditions.

Normally, in the case of windshield wiper devices, in particular in the case of wiper blades, wear phenomena occur as a result of the regular use thereof, which wear phenomena are associated with a deterioration in wiping quality. Furthermore, owing to the exposed position of windshield wiper devices on the front or rear windshield of motor vehicles, in particular when traveling through a car washing installation, there is the risk of the windshield wiper device being damaged or even torn off. In these cases, it is necessary to exchange the worn or damaged windshield wiper devices. The exchange of windshield wiper devices is traditionally relatively cumbersome, because they are normally fastened to the drive shaft by way of screw connections.

SUMMARY OF THE INVENTION

It is the object of the present invention to provide a windshield wiper device with which at least one or more of the abovementioned disadvantages are alleviated or substantially do not arise.

According to one aspect of the present invention, a windshield wiper device for a vehicle having a fastening element, in particular a motor vehicle, is proposed. The windshield wiper device comprises an installation element, which is designed for being installed on the fastening element, and a wiper blade having an elongate upper part and an elongate lower part, which are at least partially of flexible form. Furthermore, multiple connecting elements for connecting the upper part and the lower part are provided, wherein the connecting elements are spaced apart from one another along a longitudinal extent of the wiper blade. The connecting elements are designed to permit a movement of the upper part and of the lower part relative to one another with a movement component along a longitudinal extent of the wiper blade. Furthermore, the wiper blade comprises a wiper blade-side fastening part. The wiper blade-side fastening part is configured such that, by way of a rotation of the wiper blade-side fastening part relative to the installation element, an engagement action can be realized in order to connect the wiper blade-side fastening part to the installation element.

According to a further aspect of the present invention, a method for the installation of a windshield wiper device is provided. The method comprises providing a windshield wiper device as per the embodiments described herein. The method furthermore comprises fastening the wiper blade-side fastening part to the installation element by realization of an engagement action between the wiper blade-side fastening part and the installation element. Here, the wiper blade-side fastening part is rotated relative to the installation element about an axis of rotation which runs substantially perpendicular to the longitudinal extent of the wiper blade.

Preferred embodiments and special aspects of the invention will emerge from the dependent claims, from the drawings and from the present description.

With the windshield wiper device described herein according to embodiments described herein, and by way of the method for the installation of the windshield wiper device, a windshield wiper device is provided which can be installed and uninstalled in a simple manner. The windshield wiper device, which is preferably of fin-ray type, is installed in rotational fashion onto an installation element, the latter designed for being installed on the fastening element of the vehicle, and is uninstalled therefrom in rotational fashion. Accordingly, in the event of damage, the windshield wiper device can be easily exchanged or can be easily removed before traveling through a car washing installation, and subsequently installed again. Furthermore, the rotational installation and uninstallation has the advantage that the elements to be joined do not become jammed, such as may arise for example in the case of an axially parallel joining action.

In embodiments of the disclosure that may be combined with other embodiments described herein, the wiper blade-side fastening part has at least one engagement element which is designed to realize an engagement action with at least one securing element of the installation element. Thus, a windshield wiper device is provided with which a position of the wiper blade-side fastening part relative to the installation element can be fixed.

In embodiments of the disclosure that may be combined with other embodiments described herein, the securing element is formed as a cutout in the shell surface of the installation element. Thus, the windshield wiper device can be produced easily and inexpensively.

In other embodiments of the disclosure that may be combined with other embodiments described herein, the installation element has at least one engagement element which is designed to realize an engagement action with at least one securing element of the wiper blade-side fastening part. Thus, a windshield wiper device is provided with which a position of the wiper blade-side fastening part relative to the installation element can be fixed.

In embodiments of the disclosure that may be combined with other embodiments described herein, the securing element is formed as a cutout in the shell surface of the wiper blade-side fastening part. The windshield wiper device can thus be produced easily and inexpensively.

In embodiments of the disclosure that may be combined with other embodiments described herein, the installation element and/or the wiper blade-side fastening part are of cylindrical form. Thus, the windshield wiper device can be produced easily and inexpensively.

In embodiments of the disclosure that may be combined with other embodiments described herein, an internal diameter of the wiper blade-side fastening part substantially corresponds to an external diameter of the installation element. The wiper blade-side fastening part can thus be introduced or inserted into the installation element such that a position of the wiper blade-side fastening part relative to the installation element can be fixed in a secure and stable manner.

In other embodiments of the disclosure that may be combined with other embodiments described herein, an internal diameter of the installation element substantially corresponds to an external diameter of the wiper blade-side fastening part. The installation element can thus be introduced or inserted into the wiper blade-side fastening part such that a position of the wiper blade-side fastening part relative to the installation element can be fixed in a secure and stable manner.

In embodiments of the disclosure that may be combined with other embodiments described herein, the securing element is of spiral-shaped form. Thus, the engaging action during the installation process can be guided in a secure and stable manner, such that a position of the wiper blade-side fastening part relative to the installation element can be fixed in a secure and stable manner.

In embodiments of the disclosure that may be combined with other embodiments described herein, the engagement element is designed to engage into the securing element and to be guided along the securing element by the rotation of the wiper blade-side fastening part relative to the installation element. Thus, the engaging action during the installation process can be guided in a secure and stable manner, such that a position of the wiper blade-side fastening part relative to the installation element can be fixed in a secure and stable manner.

In embodiments of the disclosure that may be combined with other embodiments described herein, the engagement element is in the form of a projection. The windshield wiper device can thus be produced easily and inexpensively.

BRIEF DESCRIPTION OF THE DRAWINGS

Figure 2:
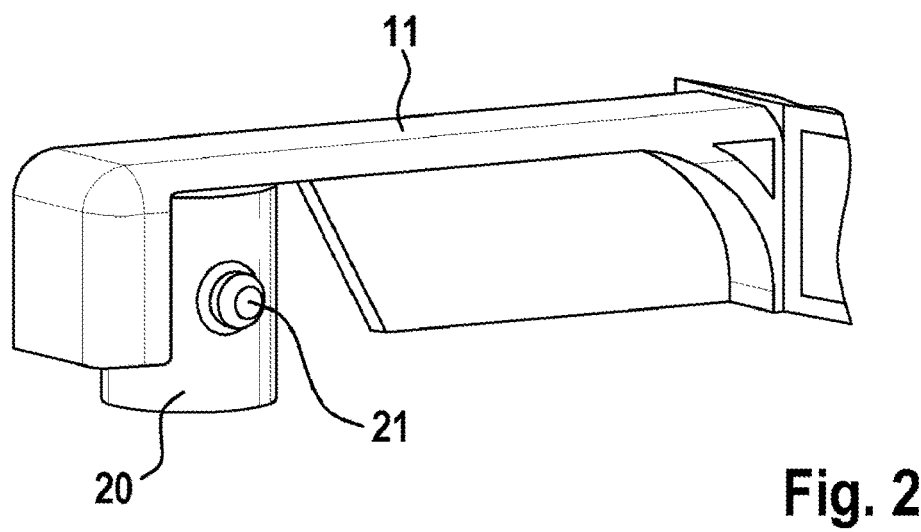
Figure 3:
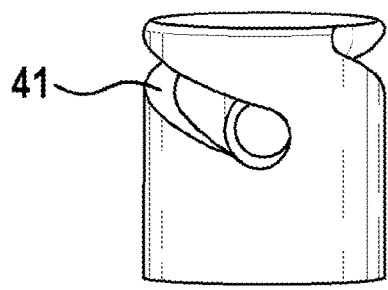
Figure 4:
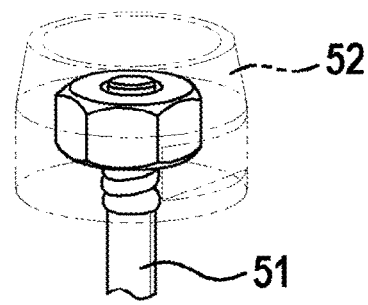
Figure 5:
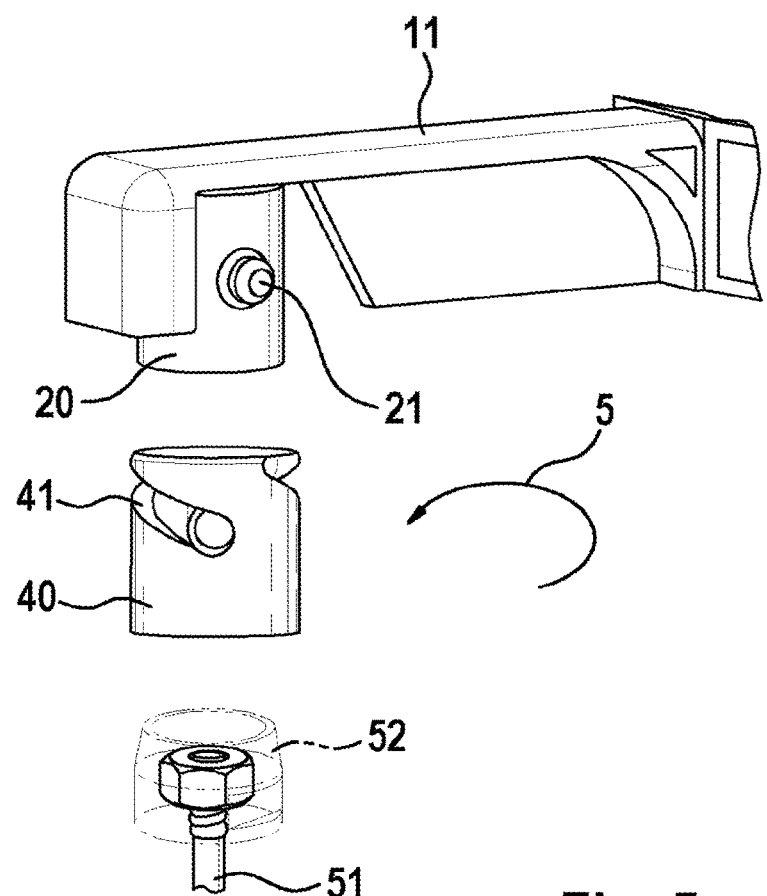
Figure 6:
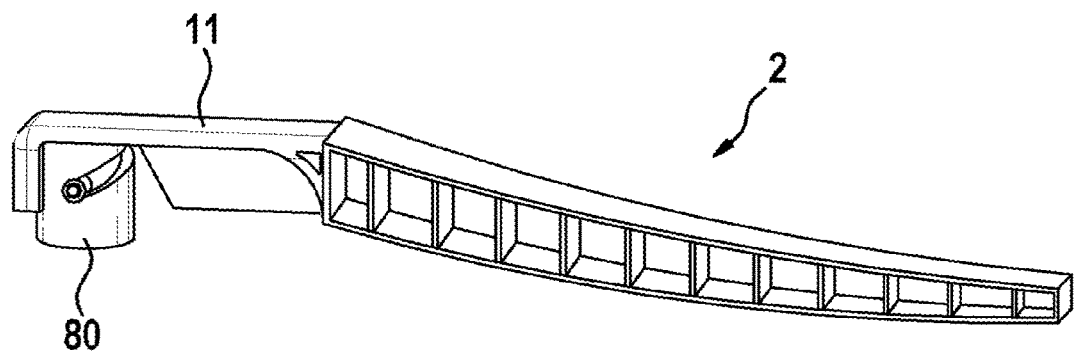
Figure 7:
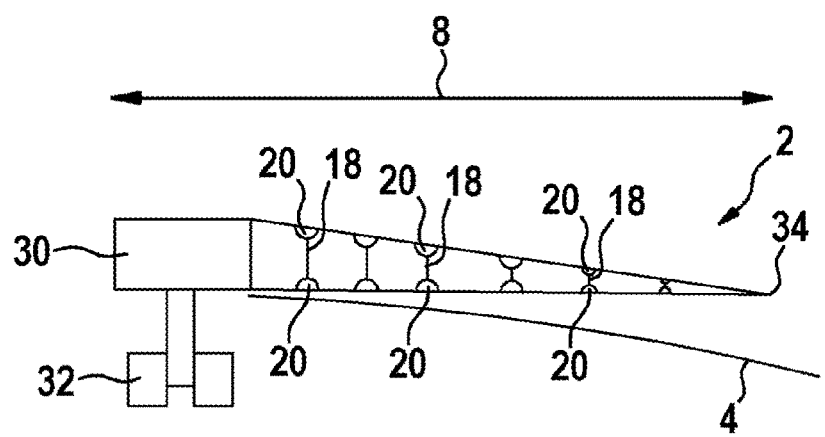
Figure 8:
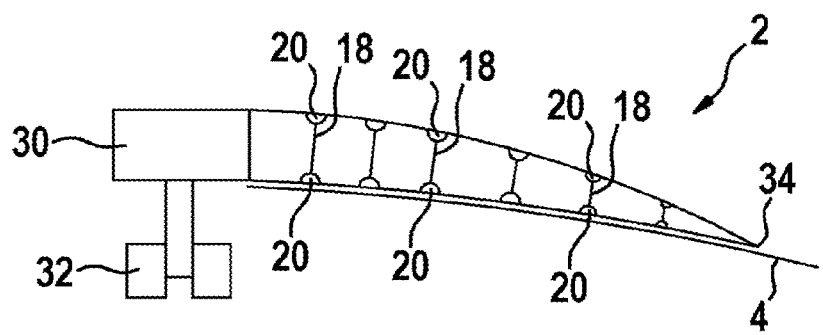
Figure 9:
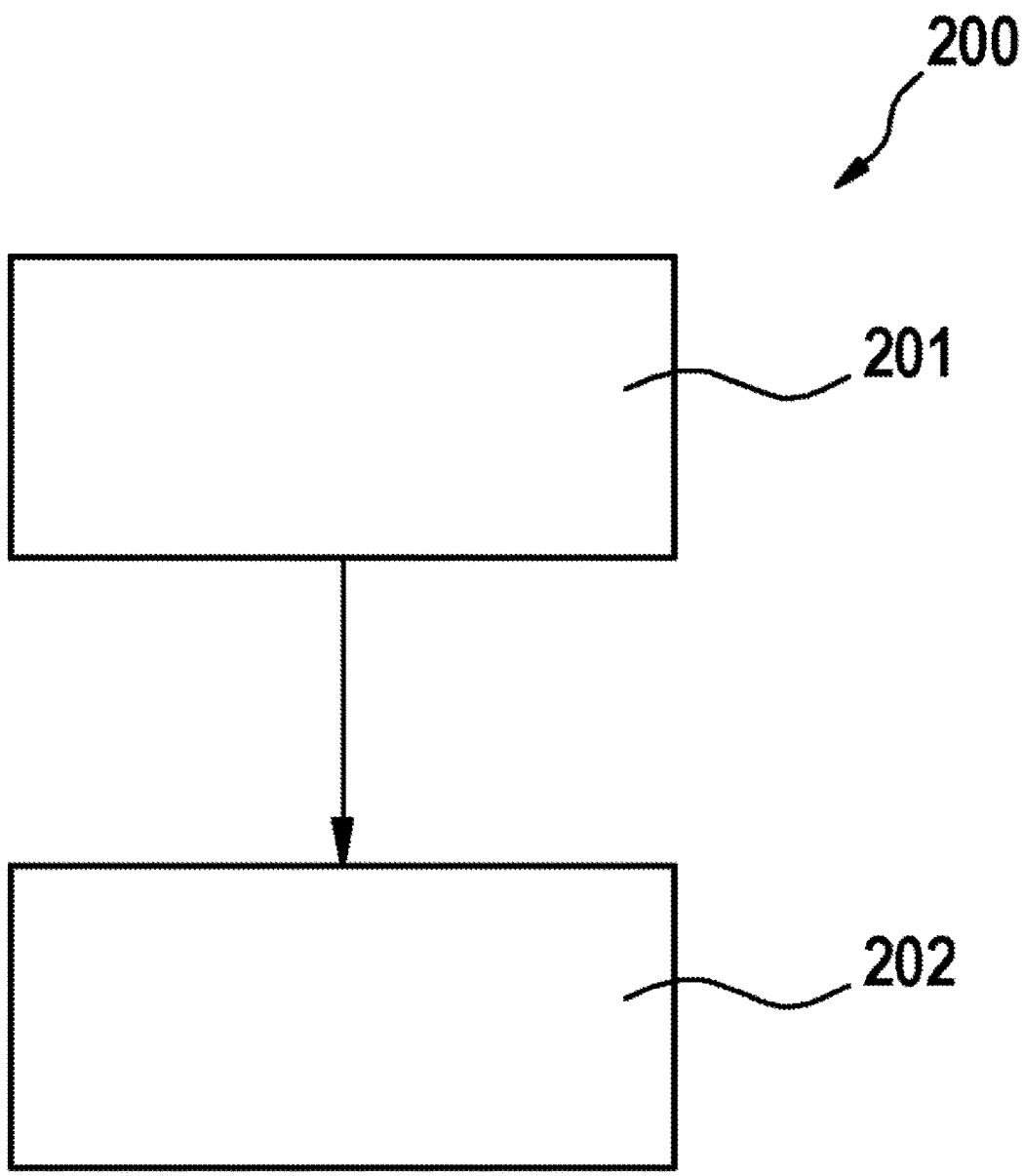

Exemplary embodiments of the invention are illustrated in the figures and will be described in more detail below. In the figures:

FIG. 1 is a schematic illustration of a windshield wiper device according to embodiments of the disclosure in an unfastened state, FIG. 2 is a schematic illustration of the fastening device of the windshield wiper device as per FIG. 1 according to embodiments of the disclosure in an unfastened state, FIG. 3 shows a perspective view of the installation element of the windshield wiper device according to embodiments of the disclosure, FIG. 4 shows a drive device of the vehicle having a fastening element, FIG. 5 is a schematic illustration of the installation of the windshield wiper device according to embodiments of the disclosure, FIG. 6 is a schematic illustration of the windshield wiper device according to embodiments of the disclosure in a fastened state, FIG. 7 is a schematic illustration of a further exemplary embodiment of a windshield wiper device according to the invention, in the form of a wiper arm with integrated wiper blade, in a basic position, FIG. 8 is a schematic illustration of the wiper arm with integrated wiper blade as per FIG. 7 in a position placed against the windshield, and FIG. 9 shows a flow diagram illustrating embodiments of the method for the installation of a windshield wiper device according to embodiments of the disclosure.

DETAILED DESCRIPTION

Below, unless stated otherwise, the same reference designations are used for identical elements and elements of identical action.

FIGS. 1 and 2 schematically illustrate a windshield wiper device 100 according to embodiments of the disclosure. FIG. 1 shows the windshield wiper device 100 in an unfastened state, and FIG. 2 shows the fastening device 11 of the windshield wiper device 100 illustrated in FIG. 1.

In embodiments of the disclosure, the windshield wiper device 100 comprises a fin-ray structure, a wiper blade-side fastening part 20, and an installation element.

In embodiments of the disclosure, the windshield wiper device 100 comprises a wiper blade 2 with an elongate upper part 10 and with an elongate lower part 12, which are at least partially of flexible form. Furthermore, multiple connecting elements 18 for connecting the upper part 10 and the lower part 12 are provided, wherein the connecting elements 18 are spaced apart from one another along a longitudinal extent 8 of the windshield wiper device 100. The connecting elements 18 are designed to permit a movement of the upper part 10 and of the lower part 12 relative to one another with a movement component along a longitudinal extent 8 of the windshield wiper device 100.

In embodiments of the disclosure that may be combined with other embodiments, the wiper blade 2 has a fastening device 11 with a wiper blade-side fastening part 20 which is connectable to the installation element. In typical embodiments, the installation element can be installed on a vehicle. The wiper blade-side fastening part 20 and the installation element are configured such that, by way of a rotation of the wiper blade-side fastening part 20 relative to the installation element, an engagement action can be realized in order to connect the wiper blade-side fastening part 20 to the fastening element 50.

In typical embodiments, the rotation during the fastening process has an axis of rotation which is substantially parallel to the axis of rotation during the operation of the windshield wiper device. A bayonet fastener is provided which, in typical embodiments described here, permits simple installation and uninstallation of the windshield wiper device.

In embodiments of the disclosure that may be combined with other embodiments, the wiper blade-side fastening part 20 is of cylindrical form. Here, the wiper blade-side fastening part 20 may be at least partially in the form of a solid cylinder or at least partially in the form of a hollow cylinder. Thus, with the embodiments described herein, the wiper blade-side fastening part 20 can be produced particularly easily and inexpensively.

As illustrated by way of example in FIGS. 1 and 2, the wiper blade-side fastening part 20 may, in embodiments of the windshield wiper device 100 that may be combined with other embodiments, have an engagement element 21. The engagement element 21 is typically designed to realize an engagement action with a securing element of the installation element. In embodiments described herein, the engagement element 21 may realize an engagement action with the securing element by way of a rotation about the axis of rotation which runs substantially perpendicular to the longitudinal extent 8 of the windshield wiper device 100.

The engagement element 21 is typically of circular form. In some embodiments of the disclosure that may be combined with other embodiments, the engagement element 21 is in the form of a projection. In typical embodiments, the engagement element 21 is formed from a projection on a shell surface of the wiper blade-side fastening part 20. Thus, with the embodiments described herein, the wiper blade-side fastening part 20 can be produced particularly easily and inexpensively.

FIG. 3 shows a perspective view of the installation element 40 of the windshield wiper device 100 according to embodiments of the disclosure.

In embodiments of the disclosure that may be combined with other embodiments, the installation element 40 is designed for being installed on the fastening element of the vehicle, as shown in FIG. 4. In typical embodiments, the installation element 40 comprises a securing element 41.

In embodiments of the disclosure that may be combined with other embodiments, the installation element 40 is of cylindrical form. The installation element 40 is typically at least partially in the form of a hollow cylinder.

In typical embodiments, the securing element 41 is formed as a cutout in the shell surface of the installation element 40. For example, the securing element 41 may be formed on an internal shell surface of the securing element 41. In some embodiments, if the installation element 40 is at least partially in the form of a hollow cylinder, the cutout may extend from the internal shell surface to the external shell surface, that is to say may extend all the way through, as shown by way of example in FIG. 3. Thus, with the embodiments described herein, the securing element 41 can be produced particularly easily and inexpensively.

In embodiments of the disclosure that may be combined with other embodiments, the securing element 41 is of spiral-shaped form. As shown by way of example in FIG. 3, the securing element 41 is formed as a spiral-shaped cutout in the shell surface of the installation element 40. In some embodiments, a spiral axis is substantially parallel to the axis of rotation which runs substantially perpendicular to the longitudinal extent 8 of the windshield wiper device 100. In typical embodiments, the cutout is open toward a top side of the installation element 40, such that the engagement element 21 of the wiper blade-side fastening part 20 can enter into engagement at that location.

In embodiments of the disclosure that may be combined with other embodiments, the engagement element 21 is designed to engage into the securing element 41 and to be guided along the securing element 41 by the rotation of the wiper blade-side fastening part 20 relative to the installation element 40. Thus, with the embodiments described herein, it is possible for a particularly effective and stable fastening device for a windshield wiper device 100 to be provided. For example, in the spiral-shaped engagement element, there may be provided a detent position, such that a stable installation state is attained in an operating position.

In embodiments of the disclosure that may be combined with other embodiments, the wiper blade-side fastening part 20 and the installation element 40 are of cylindrical form. In typical embodiments, an internal diameter of the wiper blade-side fastening part 20 substantially corresponds to an external diameter of the installation element 40. Thus, during the installation process, the wiper blade-side fastening part 20 can be inserted or introduced into the installation element 40. Thus, with the embodiments described herein, a particularly effective and stable fastening device for a windshield wiper device 100 can be provided.

In other embodiments of the disclosure that may be combined with other embodiments, the wiper blade-side fastening part 20 and the installation element 40 are of cylindrical form. In typical embodiments, an internal diameter of the installation element 40 substantially corresponds to an external diameter of the wiper blade-side fastening part 20. Thus, during the installation process, the installation element 40 can be inserted or introduced into the wiper blade-side fastening part 20. Thus, with the embodiments described herein, a particularly effective and stable fastening device for a windshield wiper device 100 can be provided.

In typical embodiments, during the rotation for the installation process, the engagement element 21 is guided along the securing element 41 as far as a stop position. For example, the engagement element 21 is guided along the securing element 41 of spiral-shaped form as far as a stop position. Here, the stop position may be an end of the securing element 41, against which the engagement element 21 abuts or bears such that a further rotation of the wiper blade-side fastening part 20 relative to the installation element 40 is prevented. Thus, with the embodiments described herein, a particularly effective and stable fastening device for a windshield wiper device can be provided.

In other embodiments of the disclosure that may be combined with other embodiments, the securing element is formed as a cutout in the shell surface of the wiper blade-side fastening part, and the engagement element is formed on the installation element. For example, the engagement element is formed on an inner shell surface of the installation element, which is at least partially in the form of a hollow cylinder, and the securing element is formed as a cutout in the shell of the engagement element. The description given with reference to FIGS. 1 to 4 applies analogously here.

FIG. 4 shows a wiper drive device 50 of the vehicle, having a fastening element 52 and a drive shaft 51. As shown in FIG. 4, the fastening element 52 is fixed or fastened to the drive shaft 51. In embodiments of the disclosure that may be combined with other embodiments, the installation element 40 is designed to be connected to the fastening element 52. In particular, the installation element 40 is designed to be mechanically connected or fastened to the fastening element 52, such that the rotational movement of the drive shaft 51 is transmitted to the installation element 40 and thus to the wiper blade 2. The fastening of the installation element 40 to the fastening element 52 may, in embodiments, be realized by way of a non-positively locking and/or a positively locking action. In further embodiments, the installation element 40 may also be installed directly onto the drive shaft 51. For example, in such an embodiment, it is possible for the fastening element 52 to be dispensed with.

FIG. 5 is a schematic illustration of the installation of the windshield wiper device 100 according to embodiments of the disclosure. FIG. 6 is a schematic illustration of the windshield wiper device 100 in a fastened state after the installation process.

In embodiments that may be combined with other embodiments, the wiper blade-side fastening part 20 and the installation element 40 are configured such that, by rotation of the wiper blade-side fastening part 20 relative to the installation element 40 about the axis of rotation, a position of the wiper blade-side fastening part 20 relative to the installation element 40 can be fixed. In embodiments, the axis of rotation is substantially perpendicular to the longitudinal extent 8 of the windshield wiper device 100 and substantially perpendicular to a working or wiping plane of the wiper blade 2. In some embodiments, the axis of rotation is substantially perpendicular to a windshield of the vehicle. In FIG. 5, the direction of rotation is indicated by the arrow 5.

In embodiments of the disclosure that may be combined with other embodiments, for the installation of the wiper blade 2 on the installation element 40 by way of a rotation of the wiper blade-side fastening part 20 relative to the installation element 40, an engagement action is realized between the wiper blade-side fastening part 20 and the installation element 40 in order to connect the wiper blade-side fastening part 20 to the installation element 40. For uninstallation, by way of a rotation in the opposite direction to the rotation during installation, the connection between the wiper blade-side fastening part 20 and the installation element 40 is released.

As shown in FIG. 5, in typical embodiments, during the installation of the windshield wiper device 100, the wiper blade-side fastening part 20 is inserted into the installation element 40. Here, the engagement element 20 of the wiper blade-side fastening part 21 engages into the securing element 41. The engagement element 21 is guided along the securing element 41 by the rotation of the wiper blade-side fastening part 20 relative to the installation element 40. In typical embodiments, the engagement element 21 is guided along the securing element 41 as far as a stop position. In the example shown in FIG. 5, the engagement element 21 is guided along the securing element 41 of spiral-shaped form as far as a stop position. Here, the stop position may be an end of the securing element 41, against which the engagement element 21 abuts or bears such that a further rotation of the wiper blade-side fastening part 20 relative to the installation element 40 is prevented. Thus, with the embodiments described herein, a particularly effective and stable fastening device for a windshield wiper device 100 can be provided.

Thus, by way of the embodiments described herein, a windshield wiper device is provided which can be installed and uninstalled in a simple manner. Accordingly, the windshield wiper device can be easily exchanged in the event of damage, or can be easily removed before traveling through a car washing installation and subsequently installed again. Furthermore, jamming of the elements to be joined, such as may arise for example in the case of axially parallel installation or joining, can be avoided.

Below, exemplary embodiments of wiper systems will be described for which the windshield wiper device described herein can advantageously be used. It is however basically possible for the fastening device described herein to also be used for other windshield wiper devices.

FIGS. 7 and 8 are schematic illustrations of a wiper blade 2 in a basic position (FIG. 7) and in a position placed against a windshield 4 (FIG. 8) according to embodiments of the windshield wiper device 100 of the disclosure.

The wiper blade 2 serves for wiping a windshield 4 of a vehicle, which is for example a motor vehicle, in particular an automobile. The wiper blade 2 is normally attached to a windshield wiper arm which, for the wiping action, is driven by way of a motor. For this purpose, the wiper blade 2 has a bracket by which it can be fastened to the windshield wiper arm. In FIG. 7, the wiper blade 2 is situated in a basic position, in which it is at least partially raised from the windshield 4. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are, or may be designed as, flexible beams which, in FIGS. 7 and 8, are for example in each case of unipartite form. This makes it possible to realize a particularly stable construction. It is likewise possible for only in each case one part of the upper part 10 and/or of the lower part 12 to be designed to be flexible. Furthermore, it is alternatively possible for the upper part 10 to be of multi-part form.

In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum flexural stiffness is thus realized. The upper part 10 and the lower part 12 are arranged so as to be situated opposite one another. One end of the upper part 10 is fixedly connected, at an outer connecting position 34, to one end of the lower part 12. Otherwise, the upper part 10 and the lower part 12 are spaced apart from one another.

The upper part 10 and the lower part 12 are connected to one another by way of connecting elements 18. In particular in the basic position of the wiper blade 2, said connecting elements run approximately transversely with respect to the longitudinal extent 8 of the wiper blade 2. The connecting elements 18 are fastened by way of rotary joints 20 to inner longitudinal sides, which face toward one another, of the upper part 10 and of the lower part 12. Here, the rotary joints 20 are hinges. In particular, the rotary joints 20 may be in the form of film hinges. This is advantageous in particular if upper part 10, lower part 12 and/or connecting elements 18 are produced from a plastics material or lined with a suitable plastics material.

In typical embodiments described here, which may be combined with other embodiments described here, a rotary joint is selected from the group comprising: a hinge, a film hinge, a narrowing of the material in order to realize relatively low stiffness along a torsional axis, a joint with an axis of rotation, a means for connecting the upper part to the connecting element or for connecting the lower part to the connecting element, which means permits the displacement of the lower part relative to the upper part along the longitudinal extent, etc.

Embodiments in which the joint is provided by a film hinge thus provide a very simple way of providing the joints for a fin-ray wiper. The wiper blade 2 may be provided in unipartite, in particular ready-from-the-mold form. In typical embodiments, the windshield wiper device, in particular the wiper blade, is produced from one or more materials from a group comprising: thermoplastic elastomer (TPE), for example TPE-S, TPE-O, TPE-U, TPE-A, TPE-V and TPE-E. The film hinges may exhibit high extensibility. This may be achieved for example by way of a material selected from the group PP, PE, POM and PA. Alternatively, the film hinges may be produced from one or more materials from a group comprising: thermoplastic elastomer (TPE), for example TPE-S, TPE-O, TPE-U, TPE-A, TPE-V and TPE-E.

The connecting elements 18 are spaced apart from one another along the longitudinal extent of the wiper blade 2. The spacings between in each case two adjacent connecting elements 18 are equal. Said spacings may however also be selected so as to differ. The spacings are advantageously less than 50 mm, in particular less than 30 mm. In this way, it is possible to ensure a particularly high level of flexibility of the windshield wiper device, in particular of its lower part, and good adaptation to the curvature and changes in curvature of the windshield to be wiped.

The connecting elements 18 are, in particular in the basic position of the wiper blade 2, fastened to the lower part 12 such that their longitudinal axes run at angles 26 of between 65° and 115°, in particular between 75° and 105°, with respect to the lower part 12. The angles particularly advantageously lie between 80° and 100°. This advantageously ensures that a force acting on the lower part is transmitted in a particularly effective manner to the upper part. Furthermore, a particularly stable windshield wiper device can be realized in this way. A corresponding situation applies to the fastenings of the connecting elements 18 to the upper part 10.

The spacings between the upper part 10 and the lower part 12 are defined primarily by the lengths of the connecting elements 18. The lengths of the connecting elements 18 increase in size proceeding from the outer connecting position as far as approximately the locations at which a fastening part 30 begins. In this way, in the side view of the wiper blade 2 as per FIG. 6, the upper part 10 and lower part 12 form a wedge. The connecting elements 18 are designed to be resistant to buckling.

FIG. 8 is a schematic illustration of the wiper blade 2 as per FIG. 7 in a position placed against the windshield 4. Since the windshield 4 has a curvature, it is the case that, when the wiper blade 2 bears against the windshield 4, contact pressure forces act on the lower part 12. Since the upper part 10 and the lower part 12 are flexible beams and the connecting elements 18 are mounted rotatably on upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the windshield 4.

Owing to the construction of the embodiments described here, it is the case that, when a force is exerted on the lower part (by the windshield 4), the lower part bends in the direction from which the force acts. This is realized by way of the connection of the upper part 10 and of the lower part at connecting positions, the shape, and by way of rotary joints at the connection between the connecting elements and the upper part and lower part.

In the illustration as per FIG. 8, there is a small spacing between the wiper blade 2 and the windshield 4, which spacing serves here merely for the illustration of the windshield 4 and of the wiper blade 2 and, in reality, substantially does not exist when the wiper blade 2 bears against the windshield 4. Furthermore, a wiper lip is typically situated on the lower side, averted from the upper part 10, of the lower part 12, which wiper lip is set down on the windshield 4 for wiping purposes. For reasons of clarity, the wiper lip is not illustrated in FIGS. 7 and 8.

A windshield wiper device according to embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle. In this way, a windshield wiper device according to the embodiments described here has the advantage of improved adaptation to a windshield of a motor vehicle. In the case of a conventional windshield wiper blade, the upper part thereof is conventionally rigid, that is to say is not designed to be flexible.

FIGS. 7 and 8 show a wiper blade 2 with a longitudinal extent 8. The windshield wiper device has only one connecting position 34. Such an arrangement is commonly used for rear windshield wipers. The disclosure is however not restricted to rear windshield wipers, and the windshield wiper device according to the embodiments described herein may also be used for front windshield wipers. Optional refinements and details such as are described in the individual embodiments may be used generally for both variants of an arrangement of a windshield wiper device.

FIGS. 7 and 8 also show a fastening part 30 to which the wiper blade 2 is attached. The fastening part 30 is connected to a wiper motor 32 which drives the fastening part 30 in order to wipe the windshield 4. The fastening part 30 may be designed according to the embodiments of the present disclosure.

The wiper blade 2 is of wedge-shaped design, wherein one end of the upper part 10 is fixedly connected at an outer connecting position 34 to one end of the lower part 12. The respective other ends of the upper part 10 and of the lower part 12 are fastened to the fastening part 30.

In FIG. 7, the wiper blade 2 is illustrated in its position in which it has not been placed against the windshield, such that the lower part 12 is of substantially straight form. According to yet further embodiments that may be combined with other embodiments, the lower part is, in the unloaded state, of convex form, that is to say with a curvature which projects away from the upper part in a central region. Upon coming into contact with a windshield, the windshield wiper device as per the embodiments described here can typically then, proceeding from the convex shape of the lower part, assume the corresponding concave shape, which adapts to the windshield, of the lower part.

FIG. 9 illustrates a flow diagram for illustrating embodiments of the method 200 for assembling a windshield wiper device 100. In embodiments of the method 200, the method 200 comprises providing 201 a windshield wiper device according to the embodiments described herein. Furthermore, the method comprises connecting 202 the wiper blade-side fastening part to the installation element by realization of an engagement action between the wiper blade-side fastening part and the installation element by rotation of the wiper blade-side fastening part relative to the installation element about an axis of rotation in order to connect the wiper blade-side fastening part to the installation element.

Thus, by way of the embodiments described herein of the windshield wiper device and by way of the method for installation of the windshield wiper device, a windshield wiper device is provided which can be installed and uninstalled in a simple manner. Accordingly, the windshield wiper device can be easily exchanged in the event of damage, or can be easily removed before traveling through a car washing installation and subsequently installed again.

What is claimed is:

1. A windshield wiper device (100) for a vehicle having a fastening element (52), the device comprising
an installation element (40) which is configured for being installed on the fastening element (52), and
a wiper blade (2) having
an elongate upper part (10) which is at least partially of flexible form, an elongate lower part (12) which is at least partially of flexible form, multiple connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and of the lower part relative to one another with a movement component along the longitudinal extent (8) of the wiper blade (2), and a wiper blade-side fastening part (20) extending from an end of the wiper blade, wherein the wiper blade-side fastening part (20) is configured such that, by way of a rotation of the wiper blade-side fastening part (20) relative to the installation element (40) a portion of the wiper blade-side fastening part (20) extends into and rotates relative to the installation element (40) and an engagement action is realized in order to connect the wiper blade-side fastening part (20) to the installation element (40), wherein the entire wiper blade is configured to rotate to form the engagement and connect the wiper blade-side fastening part (20) to the installation element (40), wherein the wiper-blade-side fastening part (20) includes an engagement element (21) which is configured to form an engagement with a securing element (41) of the installation element (40) during rotation of the wiper blade-side fastening part (20), and wherein the securing element (41) is of spiral shape.

2. The windshield wiper device (100) as claimed in claim 1, wherein the wiper blade-side fastening part (20) has at least one engagement element (21) which is configured to realize an engagement action with at least one securing element (41) of the installation element (40).

3. The windshield wiper device (100) as claimed in claim 2, wherein the securing element (41) is formed as a cutout in a shell surface of the installation element (40).

4. The windshield wiper device (100) as claimed in claim 1, wherein at least one of the installation element (40) or the wiper blade-side fastening part (20) is of cylindrical shape.

5. The windshield wiper device (100) as claimed in claim 4, wherein an internal diameter of the installation element (40) substantially corresponds to an external diameter of the wiper blade-side fastening part (20).

6. The windshield wiper device (100) as claimed in claim 2, wherein the engagement element (21) is configured to engage into the securing element (41) and to be guided along the securing element (41) by the rotation of the wiper blade-side fastening part (20) relative to the installation element (40).

7. The windshield wiper device (100) as claimed in claim 2, wherein the engagement element (21) is in the form of a projection.

8. A method (200) for the installation of a windshield wiper device, comprising:

providing (201) a windshield wiper device (100) as claimed in claim 1, and fastening (202) the wiper blade-side fastening part (20) to the installation element (40) by realization of an engagement action between the wiper blade-side fastening part (20) and the installation element (40) and rotation of the wiper blade-side fastening part (20) relative to the installation element (40) about an axis of rotation which runs substantially transversely with respect to the longitudinal extent (8) of the wiper blade (2).

9. The windshield wiper device (100) as claimed in claim 1, wherein the upper part extends along substantially an entire longitudinal length of the wiper blade and the lower part extends along substantially the entire longitudinal length of the wiper blade.

10. The windshield wiper device (100) as claimed in claim 9, wherein the connecting elements (18) extend perpendicular relative to the upper and lower parts.

11. The windshield wiper device (100) as claimed in claim 1, wherein the wiper blade includes rotary joints (20), wherein the connecting elements (18) extend between the rotary joints (20).

12. The windshield wiper device (100) as claimed in claim 11, wherein the rotary joints are film hinges.

13. The windshield wiper device (100) as claimed in claim 1, wherein the upper part and the lower part are each formed of a material having a modular of elasticity between $0.005$ $kN/mm^2$ and $0.5$ $kN/mm^2$.

14. The windshield wiper device (100) as claimed in claim 6, wherein the installation element (40) has a body, wherein the securing element (41) is a spiral-shaped cut-out in the body of the installation element (40), wherein the wiper blade-side fastening part (20) has a body extending from the end of the wiper blade, wherein the engagement element (21) is a protrusion extending from the body of the wiper blade-side fastening part (20), and wherein the protrusion is configured to be guided along the spiral-shaped cut-out.

15. The windshield wiper device (100) as claimed in claim 1, wherein the wiper blade-side fastening part (20) is integrally formed with the end of the wiper blade.

16. The windshield wiper device (100) as claimed in claim 1, wherein the installation element (40) includes a hollow cylindrical-shaped body that includes a securing element (41) in the form of a spiral-shaped cut-out along the hollow body, the spiral-shaped cut-out being open toward a top side of the installation element (40).

17. The windshield wiper device (100) as claimed in claim 16, wherein the cut-out extends entirely through a wall of the hollow body.

18. The windshield wiper device (100) as claimed in claim 1, further comprising a drive shaft (51) and a fastening element (52) coupled to an end of the drive shaft (51), wherein the installation element (40) is coupled to the fastening element (52), and wherein the entire wiper blade is configured to rotate about an axis defined by the drive shaft (51) to perform the engagement action and connect the wiper blade-side fastening part (20) to the installation element (40).

19. The windshield wiper device (100) as claimed in claim 1, wherein the wiper blade-side fastening part (20) extends as a projection from the end of the wiper blade.

20. The windshield wiper device (100) as claimed in claim 1, wherein the installation element (40) defines a drive axis, wherein the wiper blade-side fastening part (20) is configured to rotate about the drive axis during the engagement action.

21. A windshield wiper device (100) for a vehicle, with a fastening element (52), comprising an installation element (40), which is configured to be mounted on the fastening element (52), wherein the installation element (40) includes a hollow cylindrical-shaped body that includes a securing element (41) in the form of a spiral-shaped cut-out along the hollow body, the spiral-shaped cut-out being open toward a top side of the installation element (40), and a wiper blade (2) with
- an elongate upper part (10), which is configured to be at least partially bendable,
- an elongate lower part (12), which is configured to be at least partially bendable,
- a plurality of connecting elements (18) connecting the upper part (10) and the lower part (12), wherein the connecting elements (18) are spaced apart from one another along a longitudinal extent (8) of the wiper blade (2), and wherein the connecting elements (18) are configured in order to permit a movement of the upper part (10) and of the lower part relative to each other with a movement component along the longitudinal extent (8) of the wiper blade (2),
- a wiper-blade-side fastening part (20), wherein the wiper-blade-side fastening part (20) is configured such that, by means of a rotation of the wiper-blade-side fastening part (20) relative to the installation element (40) a portion of the wiper blade-side fastening part (20) extends into and rotates relative to the installation element (40), and an engagement can be formed in order to connect the wiper-blade-side fastening part (20) to the installation element (40), wherein the entire wiper blade is configured to rotate to form the engagement and connect the wiper blade-side fastening part (20) to the installation element (40), wherein the installation element (40) includes a hollow cylindrical-shaped body that includes a securing element (41) in the form of a spiral-shaped cut-out along the hollow body, the spiral-shaped cut-out being open toward a top side of the installation element (40).

22. A windshield wiper device (100) for a vehicle, with a fastening element (52), comprising an installation element (40), which is configured to be mounted on the fastening element (52), a wiper blade (2) with
- an elongate upper part (10), which is configured to be at least partially bendable,
- an elongate lower part (12), which is configured to be at least partially bendable,
- a plurality of connecting elements (18) connecting the upper part (10) and the lower part (12), wherein the connecting elements (18) are spaced apart from one another along a longitudinal extent (8) of the wiper blade (2), and wherein the connecting elements (18) are configured in order to permit a movement of the upper part (10) and of the lower part relative to each other with a movement component along the longitudinal extent (8) of the wiper blade (2),
- a wiper-blade-side fastening part (20), wherein the wiper-blade-side fastening part (20) is configured such that, by means of a rotation of the wiper-blade-side fastening part (20) relative to the installation element (40) a portion of the wiper blade-side fastening part (20) extends into and rotates relative to the installation element (40), and an engagement can be formed in order to connect the wiper-blade-side fastening part (20) to the installation element (40), wherein the entire wiper blade is configured to rotate to form the engagement and connect the wiper blade-side fastening part (20) to the installation element (40), and a drive shaft (51) and a fastening element (52) coupled to an end of the drive shaft (51), wherein the installation element (40) is coupled to the fastening element (52), and wherein the entire wiper blade is configured to rotate about an axis defined by the drive shaft (51) to form the engagement and connect the wiper blade-side fastening part (20) to the installation element (40).

* * * * *